United States Patent
Fischperer et al.

(10) Patent No.: US 10,056,841 B2
(45) Date of Patent: Aug. 21, 2018

(54) ENERGY STORAGE ARRANGEMENT, ENERGY STORAGE SYSTEM AND METHOD FOR OPERATING AN ENERGY STORAGE ARRANGEMENT

(71) Applicant: SIEMENS AKTIENGESELLSCHAFT, Munich (DE)

(72) Inventors: Rolf Fischperer, Erlangen (DE); Michael Meinert, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/022,768

(22) PCT Filed: Sep. 3, 2014

(86) PCT No.: PCT/EP2014/068738
§ 371 (c)(1),
(2) Date: Mar. 17, 2016

(87) PCT Pub. No.: WO2015/039871
PCT Pub. Date: Mar. 26, 2015

(65) Prior Publication Data
US 2016/0211753 A1 Jul. 21, 2016

(30) Foreign Application Priority Data
Sep. 17, 2013 (DE) .................. 10 2013 218 601

(51) Int. Cl.
*H02M 3/158* (2006.01)
*B60L 11/00* (2006.01)
*B60L 11/18* (2006.01)

(52) U.S. Cl.
CPC ......... *H02M 3/1582* (2013.01); *B60L 11/005* (2013.01); *B60L 11/1864* (2013.01);
(Continued)

(58) Field of Classification Search
CPC ....... H02M 3/1584; H02M 2003/1586; H02M 3/1588
See application file for complete search history.

(56) References Cited

U.S. PATENT DOCUMENTS 8,970,158 B1 * 3/2015 Chowning .............. H02P 27/16
318/127
2002/0174798 A1 11/2002 Kumar
(Continued)

FOREIGN PATENT DOCUMENTS

CN 102474180 A 5/2012
DE 19921146 A1 10/2000
(Continued)

OTHER PUBLICATIONS

Meinert, Michael, Dr. Ing. : "Einsatz neuer Energiespeicher auf Strassenbahnen" New mobile energy storage system for trams; ZEVrail 132 (2008) Tagungsband SFT Graz 2008.
(Continued)

*Primary Examiner* — Jue Zhang
*Assistant Examiner* — Lakaisha Jackson
(74) *Attorney, Agent, or Firm* — Laurence Greenberg; Werner Stemer; Ralph Locher

(57) ABSTRACT

An energy storage arrangement or configuration includes an energy store or storage device which can be connected to an electrical energy supply via a buck converter and a choke device. A boost converter is connected parallel with the energy store and the buck converter. The energy store is configured to be charged to a higher voltage level than the voltage level of the electrical energy supply. An energy storage system having multiple energy storage configurations and a method for operating an energy storage configuration are also provided.

18 Claims, 2 Drawing Sheets

(52) U.S. Cl.
CPC ....... *B60L 2200/26* (2013.01); *B60L 2210/10* (2013.01); *Y02T 10/7005* (2013.01); *Y02T 10/7022* (2013.01); *Y02T 10/7061* (2013.01); *Y02T 10/7216* (2013.01)

(56) References Cited

U.S. PATENT DOCUMENTS

| | | | |
|---|---|---|---|
| 2010/0071742 A1* | 3/2010 | de Rooij | H02M 3/1584 136/244 |
| 2012/0126764 A1 | 5/2012 | Urakabe et al. | |
| 2013/0106187 A1 | 5/2013 | Gemin et al. | |
| 2013/0234675 A1* | 9/2013 | King | B60L 11/1814 320/163 |
| 2014/0021780 A1* | 1/2014 | Choi | B60L 11/1812 307/9.1 |

FOREIGN PATENT DOCUMENTS

| | | |
|---|---|---|
| DE | 102010029450 A1 | 12/2011 |
| DE | 102011076787 A1 | 12/2012 |
| JP | H0515170 A | 1/1993 |
| RU | 2110419 C1 | 5/1998 |
| RU | 41281 U1 | 10/2004 |
| WO | 2011032736 A2 | 3/2011 |

OTHER PUBLICATIONS

Meinert, Michael, Dr.-Ing.: "Einsatz neuer Energiespeicher auf Straßenbahnen",: Sitras®MES / Sitras®HES Siemens AG, Industry Sector, Mobility Division, Wien, 30. Maerz 2009.

Chandralekha, R., et al. "The Optimization of System Performance in Hybrid Power System'Based on PV/Fuel Cell/Battery/Supercapacitor With Load Sharing Strategy". International Journal of Advanced Engineering Sciences and Technologies, vol No. 9, Issue No. 2, 237-242.

\* cited by examiner

Prior Art FIG 1
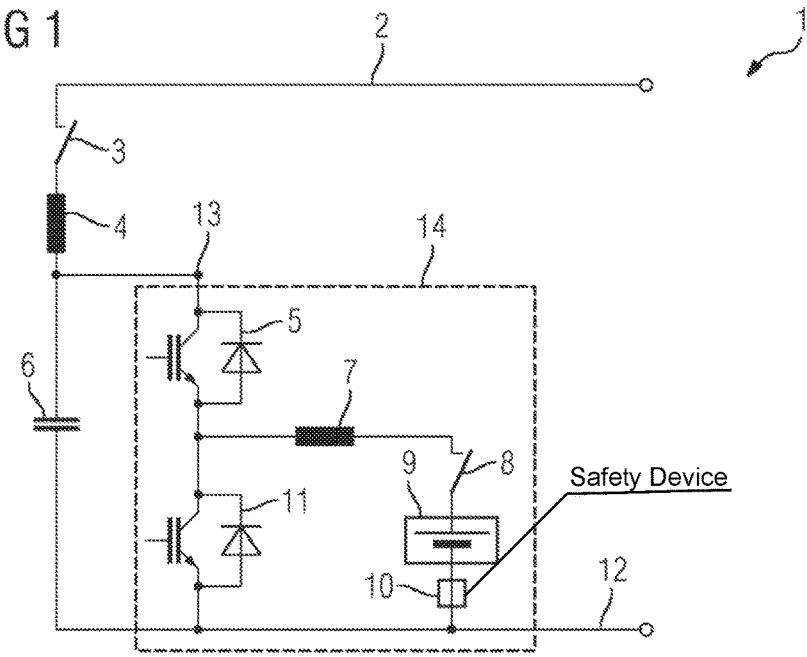
FIG 2
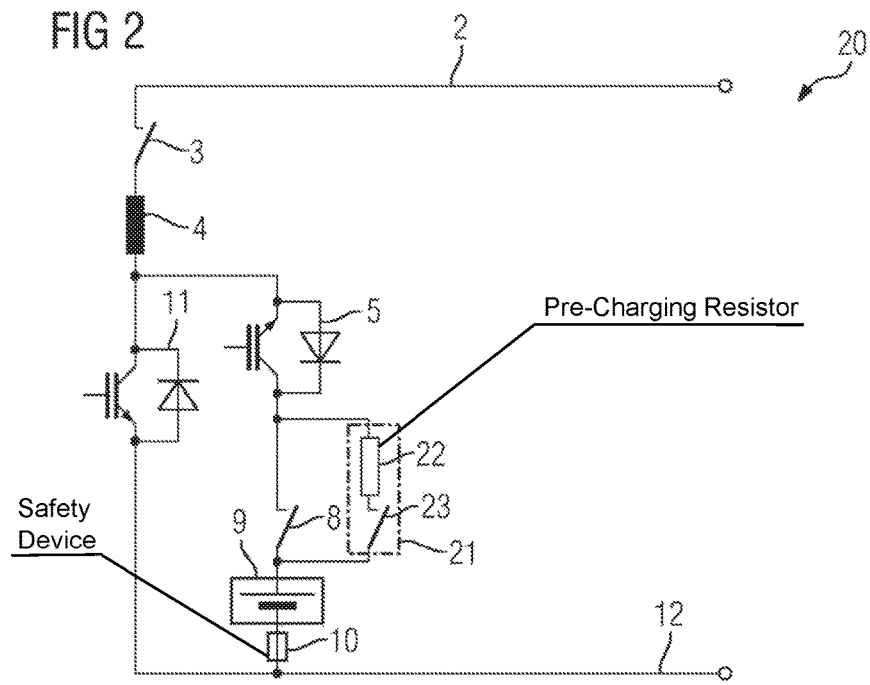

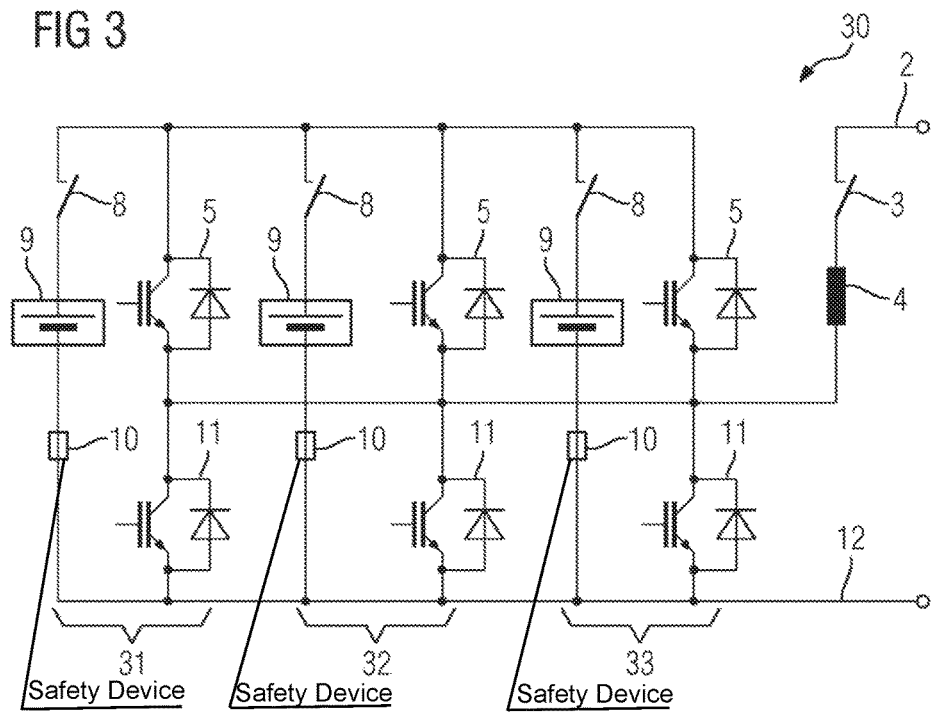
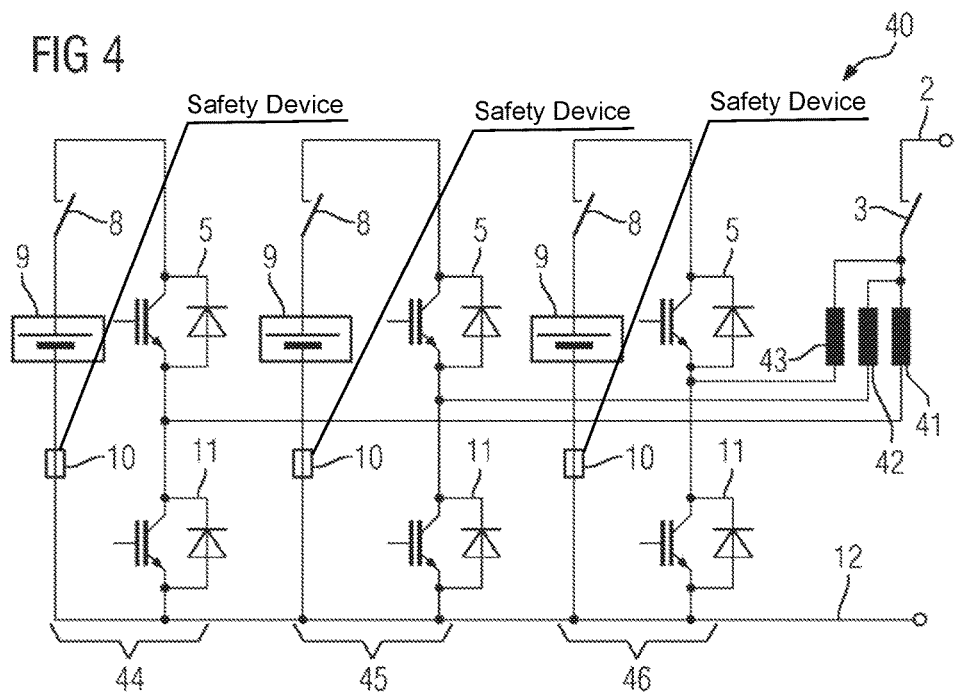

ENERGY STORAGE ARRANGEMENT, ENERGY STORAGE SYSTEM AND METHOD FOR OPERATING AN ENERGY STORAGE ARRANGEMENT

BACKGROUND OF THE INVENTION

Field of the Invention

The present invention relates to an energy storage arrangement having an energy store, which can be connected to an electrical energy supply via a buck converter and a choke device, and having a boost converter. The invention further relates to an energy storage system having a number of the aforementioned energy storage arrangements and also to a method for operating an energy storage arrangement.

Electrically-driven vehicles, for example rail vehicles such as streetcars, are frequently equipped with energy stores. The energy stores serve to electrically store braking energy during braking and use it again later for driving. In addition the energy stores make it possible for the rail vehicles to operate without overhead lines and thereby to be used autonomously without an external electrical energy supply.

A streetcar with a mobile energy store is known from the article in German entitled "Einsatz neuer Energiespeicher auf Straßenbahnen" (use of new energy stores in streetcars) by Dr. Michael Meinart, published in ZEVrail, Edition 132 from 2008, Conference Proceedings of SFT Graz 2008 (cf. enclosed FIG. 1, which is shown for the sake of simplification as a single-phase system). A 2 kWh double layer capacitor energy store is proposed as an energy store. In this case a decoupling capacitor and a pulse-controlled inverter are connected downstream of a line filter choke that is connected to an external electrical energy supply (cf. page 75, FIG. 5 of the article). A controller choke is connected to a boost converter and a buck converter of the pulse-controlled inverter, to which the double layer capacitor is connected downstream. In the proposed circuit of the double layer converter there is provision for the double layer converter to be charged at a lower voltage level than the voltage level of the electrical energy supply.

BRIEF SUMMARY OF THE INVENTION

The object of the invention is to make available an energy storage arrangement with an energy store that provides a comparatively higher electrical power and can also be implemented with comparatively low circuit technology outlay.

To achieve the object, the invention proposes as claim 1 an energy storage arrangement having an energy store, which can be connected to an electrical energy supply via a buck converter and a choke device, and having a boost converter, wherein the boost converter is disposed in parallel to the energy store and the buck converter and the energy store is suitable for being charged at a higher voltage level than the voltage level of the electrical energy supply.

The boost converter serves to charge the energy store with the lower voltage made available by the electrical energy supply, while the buck converter serves to discharge the energy store.

When switched on, the boost converter, in accordance with its clock rate, creates a short circuit with the electrical energy supply, wherein the resulting current is limited by the choke device. When the boost converter is switched off, in accordance with its clock rate, the choke maintains the current flow and guides the current into the energy store via the freewheeling diode of the buck converter. In this way the energy storage arrangement makes it possible to charge the energy store at a higher voltage level than the voltage level of the electrical energy supply.

By smoothing the currents the choke device decouples the line supply from the energy store, which is advantageous.

At the same rated current, the inventive energy storage arrangement can consequently deliver greater electrical power, since the electrical power is defined as a product of current and voltage. This is an advantage since in this way there is more electrical power available, e.g. for the electrical drive of a vehicle.

A further advantage of the inventive energy storage arrangement is that neither is a decoupling capacitor needed, since the energy store itself provides a stable voltage for switching the inventive energy storage arrangement, nor is a controller choke needed. This reduces the space required, the weight and the manufacturing costs of the inventive energy storage arrangement. In particular when the energy storage arrangement is used in a vehicle the energy consumption when driving is also reduced by the lower weight.

In a preferred form of embodiment of the energy storage arrangement the buck converter is connected to the energy store at its terminal for the voltage to be stepped down. A buck converter has at least one terminal in each case for the voltage to be stepped down and the stepped-down voltage. In this case the terminal for the voltage to be stepped down is to be understood as that terminal of the buck converter at which a comparatively higher voltage is present; the voltage which is stepped down by the action of the buck converter is present at the terminal for the stepped-down voltage. This is advantageous since the buck converter is able to be used to discharge the energy store charged at a comparatively higher voltage level by comparison with the voltage of the electrical energy supply. A further advantage is that the free-running diode of the buck converter does not block during charging of the energy store at the voltage level of the electrical energy supply.

In another preferred form of embodiment of the inventive energy storage arrangement the choke device is embodied such that it acts as a controller choke and as a line filter choke. This is advantageous because a single choke device is sufficient and a line choke and an additional controller choke are not needed.

In a further preferred form of embodiment of the inventive energy storage arrangement a pre-charging device is connected upstream of the energy store. The use of a pre-charging device is advantageous because a discharged energy store can be pre-charged by said device in a controlled manner to the voltage level of the electrical energy supply. Through this, starting from a pre-charged energy store, correct functioning of the buck converter and boost converter used is guaranteed.

In a development of the aforementioned form of embodiment of the inventive energy storage arrangement the pre-charging device is disposed between buck converter and energy store.

In a further development of the aforementioned form of embodiment of the inventive energy storage arrangement the pre-charging device is disposed upstream of the choke device.

In another preferred form of embodiment of the inventive energy storage arrangement the pre-charging device has a pre-charging resistor and a pre-charging switching device. This is of advantage because the pre-charging resistor makes it possible to charge the energy store in a controlled manner and the pre-charging switching device makes it possible to switch the pre-charging device on or off.

In another preferred form of embodiment of the inventive energy storage arrangement a safety device is disposed downstream of the energy store. This is advantageous because, in the event of an error, the safety device prevents the occurrence of currents that are too high or voltages that are too high and of the dangers associated therewith.

In a further preferred form of embodiment of the inventive energy storage arrangement an energy store switching device is disposed in parallel to the pre-charging device. The energy store switching device enables the energy store to be rapidly and reliably switched on or switched off, which is vital as part of maintenance work for example. Furthermore the pre-charging device can be short circuited.

In a further preferred form of embodiment of the inventive energy storage arrangement the electrical energy supply comprises a rail power supply network. This is advantageous since, especially for mobile and/or stationary energy storage arrangements (e.g. at charging stations/stops) supplied by the rail power supply network, an especially high electrical power is needed for driving the rail vehicles; this is achieved by the voltage level of the energy storage arrangement lying above the voltage level of the rail power network.

In another preferred form of embodiment of the inventive energy storage arrangement the energy store comprises a mobile energy store of a vehicle. This is of advantage because a vehicle, such as possibly a rail vehicle, needs high electrical power in order to be able to move without an external electrical energy supply. With the inventive energy storage arrangement there is high power with comparatively low weight and comparatively small space requirements compared to known energy storage arrangements. A further advantage is that the small space required and the comparatively simple circuit means that the arrangement can be manufactured at lower cost.

In a further preferred form of embodiment of the inventive energy storage arrangement the energy store comprises a stationary energy store. In such cases a double layer capacitor at a charging station for an electric car or an electric rail vehicle can be involved, which is supplied via a conventional power line of an electrical low-voltage network and which can be charged by the inventive electrical energy storage arrangement to a higher voltage level than the voltage level of the supply line. This is an advantage since, through this arrangement, high electrical power for charging electric automobiles or electric rail vehicles can be provided in a short time.

In a further preferred form of embodiment of the inventive energy storage arrangement the energy store comprises an electrochemical energy store and/or an electrical energy store and/or a pseudocapacitor. An electrochemical energy store can be a battery for example. The use of an electrochemical energy store is advantageous because electrochemical energy stores can store a large amount of electrical energy. A further advantage of electrochemical energy stores is that said stores can be dimensioned so that, even at maximum discharge of the electrochemical energy store, the residual voltage of the electrochemical energy store still lies above the supply voltage; thus the entire energy content can be obtained via the buck converter. An electrical energy store can involve a double layer capacitor for example. The use of an electrical energy store is advantageous since said store is able to be charged and discharged in an especially short time and therefore, e.g. in an electrical rail vehicle, can provide large amounts of energy for acceleration processes. As well as a double layer capacitor it is also possible to use a pseudocapacitor or a hybrid capacitor. Basically all energy store types can be constructed internally from a number of modules, which are connected in parallel and/or in series.

In a further preferred form of embodiment of the inventive energy storage arrangement the choke device has a line switching device disposed upstream from it. The line switching device disconnects the energy storage arrangement from the electrical energy supply where necessary or switches said supply on. This is advantageous because, both in the event of an error and for maintenance work, a rapid switch-on and switch-off of the energy supply is guaranteed by the line switching device.

In accordance with a further aspect of the present invention an energy storage system is proposed in which a plurality of inventive energy storage arrangements are connected in parallel. This is of advantage because, by the use of a number of energy storage arrangements, on failure of a converter, electrical power continues to be able to be provided by the remaining converters and the corresponding remaining energy stores. In a preferred development of the aforementioned form of embodiment of an inventive energy storage system the parallel-connected energy storage arrangements are able to be connected to the electrical energy supply network 2 by means of a common line choke unit. This is of advantage because only one choke device is needed and thus a number of choke units can be saved. This lowers the manufacturing costs and reduces the space required by the energy storage system, which cuts costs in both manufacturing and also in operation.

In another preferred development of the aforementioned inventive energy storage system the parallel-connected energy storage arrangements are each able to be connected to the electrical energy supply network by a line choke device. This is of advantage because, by using a line choke device for each of the energy stores, the individual energy stores can be loaded differently. This enables different types of energy store to be used, which each have a different maximum voltage for example.

A further object of the present invention is a method for operating an energy storage arrangement with an energy store, which is able to be connected to an electrical power supply via a buck converter, wherein the energy store is connected to the terminal for the voltage of the buck converter to be stepped down, and a choke device, and with a boost converter disposed in parallel to the energy store and to the buck converter, in which the energy store is charged by the boost converter being switched on to short circuit the electrical energy supply in accordance with its clock rate, wherein the resulting current is limited by means of the choke device, and the boost converter is switched off in accordance with its clock rate, wherein the current flow is guided by means of the choke device into the energy store; the energy store is discharged by the output voltage of the energy store being lowered by means of the buck converter to the voltage level of the electrical energy supply. The advantages produced are analogous to those described at the start for the inventive energy storage arrangement.

In a preferred development of the inventive method the energy store is pre-charged by means of a pre-charging device to the voltage level of the electrical energy supply. The advantages produced are analogous to those described at the outset for the inventive energy storage arrangement.

BRIEF DESCRIPTION OF THE SEVERAL VIEWS OF THE DRAWING

In the figures, in schematic diagrams

FIG. 1 shows a prior-art energy storage arrangement and

FIG. 2 shows a form of embodiment of an inventive energy storage arrangement, and FIG. 3 shows a form of embodiment of an inventive energy storage system, and FIG. 4 shows another form of embodiment of an inventive energy storage system.

DESCRIPTION OF THE INVENTION

FIG. 1 shows an energy storage arrangement known from the article entitled "Einsatz neuer Energiespeicher auf Straßenbahnen" (use of new energy stores in streetcars) (page 75, FIG. 5) by Dr. Michael Meinart, which is embodied as a three-phase arrangement by means of a pulse-controlled inverter, in a simplified single-phase diagram. In this case an electrical energy supply 2, such as a rail power supply network for example, is connected via a line switching device 3 and a line choke device 4 to a decoupling capacitor 6.

Provided in parallel to the decoupling capacitor 6 is a series circuit consisting of a buck converter 5 and a boost converter 11. The boost converter and the buck converter 5, 11 involve controllable semiconductor elements such as IGBTs for example. At its terminal for the voltage to be stepped down, the buck converter 5 is connected to the choke device 4 or to the electrical energy supply 2.

Connected between the boost converter 5 and the buck converter 11 is a controller choke 7, downstream of which an energy store switching device 8 is disposed. The energy store switching device 8 involves a controllable switch. Disposed downstream of the energy store switching device 8 is an energy store 9. The energy store 9 involves an electrical energy store for example, such as a double layer capacitor and/or an electrochemical energy store for example, such as a battery and/or a pseudocapacitor. Disposed downstream of the energy store 9 is a safety device 10.

The controller choke 7, the energy store switching device 8, the energy store 9 and the safety device 10 are switched in series and in parallel to the boost converter 11. The decoupling capacitor 6, the boost converter 11 and the safety device 10 are switched in parallel and are connected to a bus bar 12.

The way in which the energy storage arrangement 1 functions will now be explained in brief below. If required, the line switching device 3 disconnects the energy store and the rest of the arrangement from the electrical energy supply 2. By smoothing the currents, the line choke device 4 decouples the electrical energy supply 2 from the energy store 9. The decoupling capacitor 6 is designed as a link circuit capacitor and makes sure that the voltage is stable, so that the boost converter and the buck converter can be suitably clocked. The buck converter 5 serves to charge the energy store 9. During this process the electrical energy supply 2 has a higher voltage than the maximum charge voltage of the energy store 9. The buck converter 5 therefore serves to set the desired charging current in the circuit of the energy store 9. The boost converter 11 serves to discharge the energy store 9, so that the energy store 9, despite its lower voltage by comparison with the electrical energy supply 2, can feed the electrical energy supply 2. The energy store switching device 8 serves to disconnect the energy store 9, e.g. for maintenance purposes. The safety device 10 limits the current in the event of an error.

In the form of embodiment of the inventive energy storage arrangement 20 shown in FIG. 2, the series circuit consisting of buck converter and energy store 9 is switched in parallel with the boost converter 11. The choke arrangement 4 disposed upstream of the two converters 5, 11 serves in the inventive energy arrangement 20 both as a line choke and also as a controller choke. The energy store 9 and the safety device 10 are connected downstream of the buck converter 5, wherein the buck converter (5) is connected to the energy store (9) at its terminal for the voltage to be stepped down. The energy store switching device 8, which has a pre-charging device 21 connected in parallel, is provided between the buck converter 5 and the energy store 9. The pre-charging device 21 consists of a pre-charging resistor 22 and a pre-charging switching device 23. The way in which the energy store arrangement 20 functions will now be dealt with in brief below.

The buck converter 5, by contrast with the prior art form of embodiment according to FIG. 1, is no longer linked with its input side to the choke device 4 and to the electrical energy supply 2 connected thereto, but is connected to the energy store 9. The buck converter no longer serves to charge the energy store 9, but to discharge it. It is clocked so that the higher store voltage is adapted to the lower voltage of the electrical energy supply 2 such that the desired discharge current is set. A number of clocking methods known in the prior art can be used for this purpose.

The boost converter 11 is connected in accordance with FIG. 2 by its output side via the choke device 4 to the electrical energy supply 2 and serves to charge the energy store 9. When switched on, the boost converter 11 creates a short circuit with the electrical energy supply 2; the resulting current is limited by the choke device 4. When the converter is switched off, the choke device 4 maintains the current flow and guides it via the free-running diode of the buck converter 11 into the store, so that the latter is charged, although the voltage of the electrical energy supply 2 is lower than the voltage level of the energy store 9. Various known methods of the prior art for clocking can likewise be used to do this. The pre-charging device 21 is needed in the event of the voltage level of the energy store 9 lying below the voltage of the electrical energy supply 2. This situation can occur for example as a result of a discharge for maintenance purposes. The energy store 9 must initially be charged so that the converters can operate as intended. The pre-charging device enables the energy store 9 to be charged up in a controlled manner to the voltage of the electrical energy supply 2. In the exemplary embodiment shown in FIG. 2, the pre-charging device is fitted between the buck converter 5 and the energy store 9. As an alternative the pre-charging device can however also be connected upstream of the choke device 4 or the line switching device 3. To smooth line-side currents, a filter device not shown in FIG. 2 can be provided, which is formed from a filter capacitor for example and, together with the choke device 4, achieves the desired filter effect, wherein the choke device 4 serves both as controller choke and also as line filter choke.

By contrast with the known energy storage arrangement 1 in accordance with FIG. 1, a decoupling capacitor is not needed, since the energy store 9 itself provides a stable voltage for switching the converters 5, 11. A further advantage is that no controller choke 7, as provided in FIG. 1, is needed, because this function is performed by the choke device 4.

Through the modified arrangement of the boost converter 11 and the buck converter 5 in accordance with FIG. 2, by comparison with FIG. 1, an increase of the voltage level of the energy store 9 above the voltage level of the electrical energy supply 2 is made possible. In addition the decoupling capacitor and the controller choke are dispensed with, which reduces manufacturing and maintenance costs and lowers the weight and size of the module.

In the form of embodiment of the inventive energy storage system 30 depicted in FIG. 3 three energy storage arrangements 31 to 33 are connected jointly via one choke device 4 to the electrical energy supply 2. In this case, in FIG. 3 and also in FIG. 4, a different way of presenting the diagrams is selected than in FIGS. 1 and 2, in order to be able to illustrate the arrangement with a number of energy storage arrangements 31-33 more easily. Through this embodiment an equal voltage level and an equal current flow is guaranteed for all energy stores 9 in the energy storage system 30. An advantage of this circuit is that the joint use of one choke device 4 means that savings are made in further choke devices for each individual energy store 9. A further advantage is that a defective controller does not lead to a total outage of the energy storage system 30, since the remaining energy stores 9 can be accessed with the remaining converters 5, 11.

In the form of embodiment of the inventive energy storage system 40 in accordance with FIG. 4, one choke device 41 to 43 is provided for each energy storage arrangement 44 to 46. This has the advantage that the energy stores 9 can be charged to different voltage levels. This is particularly an advantage in enabling the individual energy stores 9 to be loaded differently and also enabling different types of energy store 9 to be used in each case in the three energy storage arrangements 44 to 46. For example one of the energy stores 9 can involve an electrochemical battery, while the further energy stores 9 can involve double layer capacitors.

The invention claimed is:

1. An energy storage configuration, comprising:
   an energy storage device;
   a buck converter and a choke device to be connected between said energy storage device and an electrical energy supply having a voltage level; and
   a boost converter connected parallel to said energy storage device and said buck converter;
   said energy storage device being configured to be charged to a higher voltage level than the voltage level of the electrical energy supply; and
   said choke device configured to guide a current flow from the electrical energy supply to said energy storage device when said boost converter is switched off.

2. The energy storage configuration according to claim 1, wherein said buck converter has a terminal for a voltage to be stepped down and said terminal is connected to said energy storage device.

3. The energy storage configuration according to claim 1, wherein said choke device is constructed to act as a controller choke and as a line filter choke.

4. The energy storage configuration according to claim 3, which further comprises a pre-charging device connected upstream of said choke device.

5. The energy storage configuration according to claim 1, which further comprises a pre-charging device connected upstream of said energy storage device.

6. The energy storage configuration according to claim 5, wherein said pre-charging device is connected between said buck converter and said energy storage device.

7. The energy storage configuration according to claim 5, wherein said pre-charging device has a pre-charging resistor and a pre-charging switching device.

8. The energy storage configuration according to claim 5, which further comprises an energy storage device switching device connected parallel to said pre-charging device.

9. The energy storage configuration according to claim 1, which further comprises a safety device connected downstream of said energy storage device.

10. The energy storage configuration according to claim 1, wherein the electrical energy supply is a rail power supply network.

11. The energy storage configuration according to claim 1, wherein said energy storage device is a mobile energy storage device of a vehicle.

12. The energy storage configuration according to claim 1, wherein said energy storage device is a stationary energy storage device.

13. The energy storage configuration according to claim 1, wherein said energy storage device is at least one of an electrochemical energy storage device or an electrical energy storage device or a pseudocapacitor.

14. An energy storage system, comprising:
   a plurality of energy storage configurations according to claim 1 being connected in parallel.

15. The energy storage system according to claim 14, wherein said choke device is configured to connect all of said parallel-connected energy storage configurations to the electrical energy supply network.

16. The energy storage system according to claim 14, wherein said choke device is one of a plurality of choke devices each configured to connect a respective one of said parallel-connected energy storage configurations to the electrical energy supply network.

17. A method for operating an energy storage configuration, the method comprising the following steps:
   providing an energy storage device, a buck converter having a terminal for a voltage to be stepped down, a choke device and a boost converter, the energy storage device being connected to the terminal of the buck converter, the buck converter and the choke device configured to be connected between the energy storage device and an electrical energy supply, and the boost converter being connected parallel to the energy storage device and the buck converter;
   charging the energy storage device by switching on the boost converter to short circuit the electrical energy supply in accordance with its clock rate, limiting a resulting current by using the choke device, switching off the boost converter in accordance with its clock rate, and subsequently guiding a current flow from the electrical energy supply through the choke device and into the energy storage device while the boost converter is switched off; and
   discharging the energy storage device by lowering an output voltage of the energy storage device to a voltage level of the electrical energy supply by using the buck converter.

18. The method according to claim 17, which further comprises using a pre-charging device to pre-charge the energy storage device to the voltage level of the electrical energy supply.

* * * * *